Figure 1:
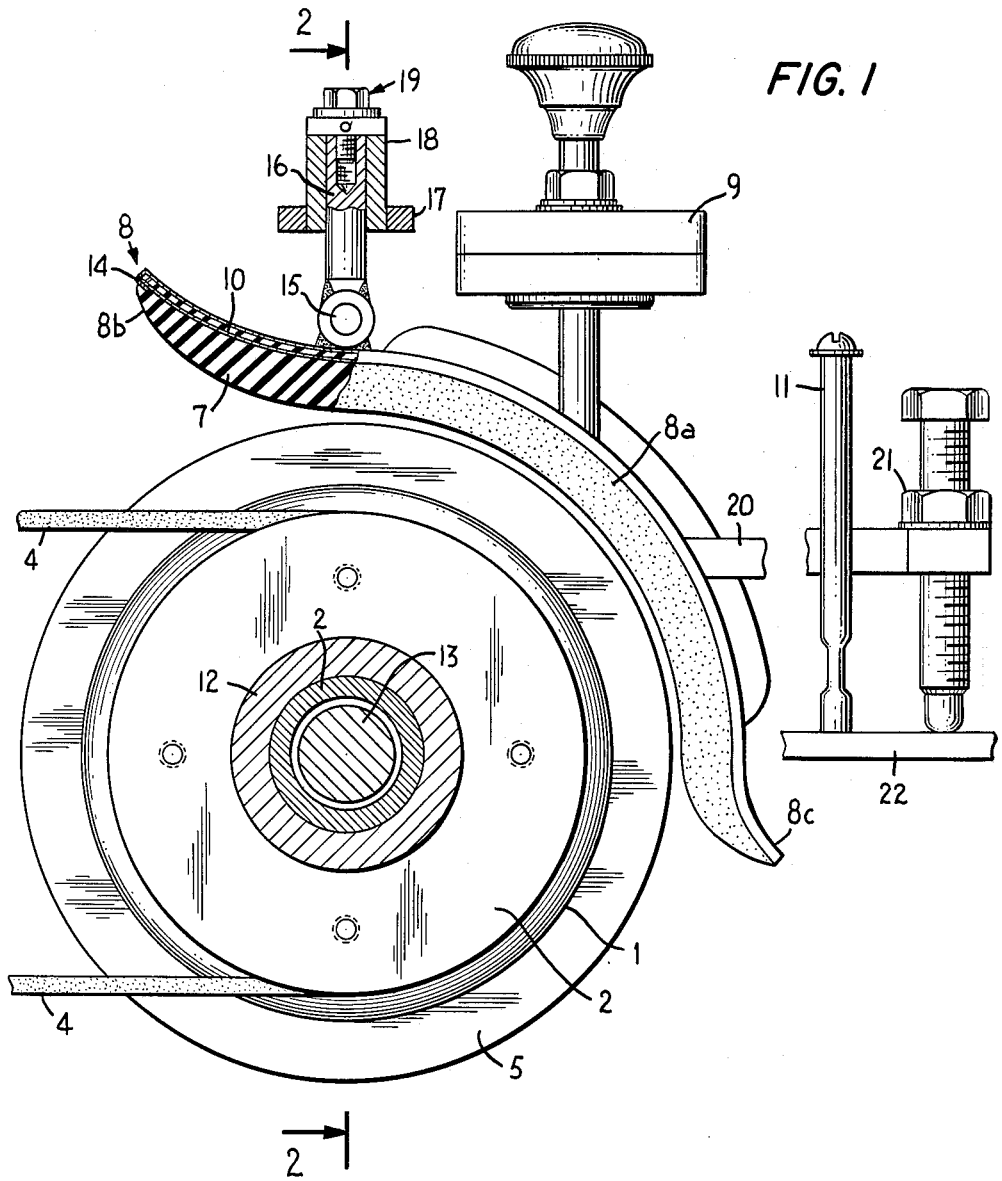

Jan. 18, 1966　　　A. P. ALVAREZ　　　3,229,740
FRUIT SPLITTING DEVICE

Filed July 30, 1963　　　　　　　　　　2 Sheets-Sheet 2

INVENTOR.
ALFONSO PEREZ ALVAREZ
BY
Brumbaugh, Free, Graves & Donohue
his ATTORNEYS 3,229,740
FRUIT SPLITTING DEVICE
Alfonso Perez Alvarez, Murcia, Spain, assignor to Compania Hispano Americana de Constructiones Conserveras S.A., Murcia, Spain
Filed July 30, 1963, Ser. No. 298,682
Claims priority, application Spain, Aug. 4, 1962, 279,923
2 Claims. (Cl. 146—73)

This invention relates to fruit processing apparatus and, more particularly, to a device for splitting fruit having free stones, such as peaches, plums, apricots and the like, so that the stones may be removed therefrom.

In the preparation for canning, freezing or for use in prepared products of fruits which have pits or stones, it is necessary that the fruit be cut in half and the stone removed. Inasmuch as the harvesting season of such fruit is very short and the fruit is subject to perishing very quickly after being picked, there has been a great need for efficient apparatus for automatically splitting the fruit to enable the removal of the stones which is capable of handling large quantities of fruit in a relatively short time. In addition to the requirement of being fast, such apparatus should be capable of receiving fruit of various sizes and shapes and cutting it without bruising and squeezing the eatable portion and without breaking or splintering the stone.

The present invention relates to apparatus for splitting fruits for use in conjunction with suitable apparatus for conveying oblong fruits such as peaches, apricots, plums and the like, and orienting them into a position for slicing or splitting.

There is provided, in accordance with the present invention, a fruit splitting device which is adaptable to such automatic conveying and orienting apparatus for peripherally splitting such fruits along a plane generally through the seam line.

The conveying apparatus referred to above includes a pair of spaced-apart conveyor belts by which fruit is carried into cutting means. The belts are driven by pulleys mounted on a shaft. In the splitting device of the present invention, a circular cutting blade of somewhat greater diameter than that of the pulleys is mounted between the pulleys on the same shaft. Means are provided on opposite sides of the pulleys and cutter to retain the fruit laterally in its oriented position during and after the cutting. Means are also provided for urging the fruit radially with a predetermined force toward and onto the circular cutting blade, such means, however, being sufficiently yieldable to prevent undue squeezing or bruising of the fruit and also to permit fruits of various sizes and shapes to be passed through the splitting device.

Figure 2:
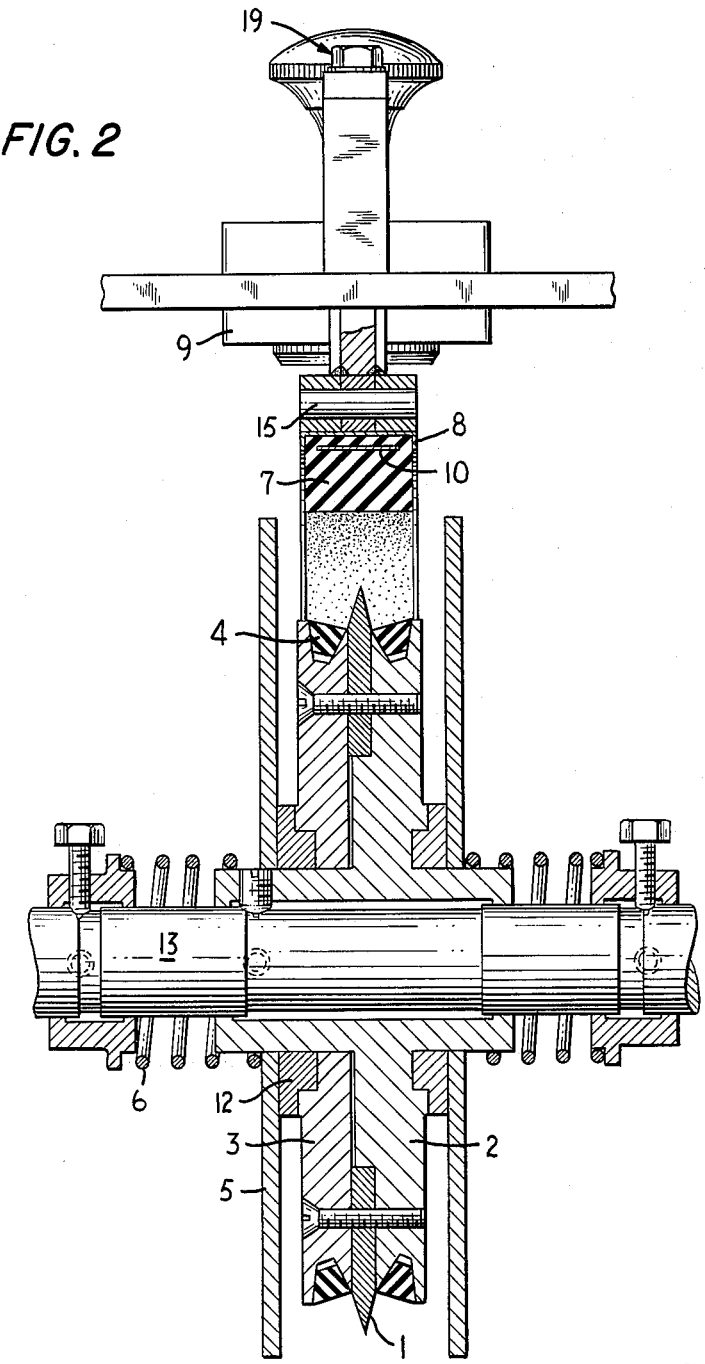

For a better understanding of the invention reference may be made to the following description of an exemplary embodiment of a fruit splitting device, taken in conjunction with the figures of the appended drawings, in which:

FIGURE 1 is a side elevational view of a first splitting device, in accordance with the invention; and FIG. 2 is an end view in section taken generally along the line 2—2 of FIG. 1, and in the direction of the arrows.

The splitting device includes a circular cutting blade 1 mounted on a shaft 13 between two pulleys 2 and 3. Each of the pulleys 2 and 3 receives a conveyor belt 4 by which a fruit is carried to the blade 1. Mounted on the shaft 13 adjacent each of the pulleys 2 and 3 and spaced therefrom by spacing rings 12 are discs 5 which hold the fruit laterally as it is carried through the splitting device. The discs 5 are pressed inwardly toward the pulleys 2 and 3 by springs 6 which provide adequate force to hold the fruit in the proper position during cutting and to retain the two pieces together after cutting without bruising or excessively squeezing it. It will be clear, of course, that the springs yield to permit fruits of various sizes to be carried through the splitting device.

As shown in FIG. 1, the splitting device includes a curved housing 8 having a portion 8a which runs generally concentrically about a segment of the blade of approximately 90 degrees in radial measure. The concentric portion 8a of the housing 8 is located approximately in the upper, forward quadrant of the blade 1 which is subtended by its vertical and horizontal axes. The fruit is guided into the space between the concentric portion 8a and the blade 1 by an upwardly curved rear part 8b of the housing 8, and moves smoothly out of the device along a forwardly curving front part 8c.

Secured to the lower surface of the housing 8 is a resilient pad 7, which may be of any suitable elastomeric material such as sponge rubber. The pad 7 serves to frictionally hold the fruit and to cushion it against bruising as it passes through the device, as will be described in greater detail below. Advantageously, the pad 7 may be manufactured so as to be replaceable periodically by providing a spring-like strap 10 which is received and held by flanges 14 at each end of the housing 8.

The housing 8 is adapted for longitudinal pivoting by a pivot arrangement 15 which is attached to a rod 16 suspended from a suitable transverse frame 17. The rod 16 is slidable vertically within a sleeve 18 fastened to the frame 17. The lowermost position of the housing 8 is limited by an adjustable stop 19 attached to the member 16.

A second mounting arrangement for the housing 8 consists of an arm 20 which is attached thereto and projects forward. The arm 20 passes through a slotted member 11, which prevents lateral shifting of the housing 8, and has a bolt 21, which is vertically adjustable, installed in its end. The bolt 21 rests on a frame member 22 to limit the downward and pivotal movement of the housing 8.

Mounted on the housing 8 intermediate the pivot arrangement 15 and arm 20 are weights 9 which urge the housing 18 downwardly toward the blade 1 with a predetermined force. The amount of weight used may, of course, be changed in accordance with the characteristics of the fruit so that the fruit is pressed onto the blade with sufficient force to cut it, but insufficient to bruise or squash it.

The operation of the fruit splitting device is described as follows. The fruit is carried into the fruit splitting device by the conveyor belts 4 oriented such that a plane passing through its seam line is substantially coincident with the plane defined by the cutting edge of the blade 1. The fruit is received and retained between the discs 5 and, as it continues along on the belts 4, is engaged between the blade 1 and the weighted housing 8, the latter pressing it downwardly onto the blade 1 which cuts into it.

Inasmuch as the opposite surfaces of the fruit are frictionally engaged by the belts 4 and the resilient pads 7, respectively, the fruit is counter-rotated with respect to the direction of rotation of the blade 1 and pulleys 2 and 3 and at the same time is carried in a rolling fashion through the splitting device. It is split to a depth almost to the stone completely about its perimeter and along a line defined by a plane passing generally through the seam line. The split-apart sections, however, are retained together by the discs 5 thus preventing them from turning over and becoming mutilated.

When the fruit reaches the curved portion 8c of the housing 8 it is released from pressure against the blade 1 and is ejected by centrifugal force away from the conveyor belts 4 and out of the discs 5. The two parts will then separate and will be deposited on a conveyor belt or other means for further processing. The free stone will drop out or may be removed by suitable means.

It will be understood by those skilled in the art that the above-described embodiment of a fruit splitting device is susceptible of modification and variation without departing from the scope and spirit of the invention. Therefore, the scope of the invention will not be deemed limited except as defined by the following claims:

I claim:

1. A device for splitting fruit having free stones, said device adapted to apparatus which includes a pair of spaced apart conveying belts, comprising a shaft, a circular blade mounted on said shaft, means for rotating said shaft, a curved housing extending concentrically about a portion of said circular blade and spaced therefrom, a resilient pad mounted on the inner surface of said housing for frictionally engaging and cushioning said fruit, a two point floating mounting means for said housing, means on said housing for urging it downwardly with a predetermined force, a pulley mounted on said shaft on each side of said circular blade, spacer means mounted adjacent each of said pulleys, a disc mounted for axial movement on said shaft adjacent each side of said spacer means and lying substantially parallel to said blade, and spring means for urging said discs inwardly toward said spacer means.

2. A device for splitting fruit having free stones comprising a shaft, a circular blade mounted on said shaft, means for rotating said shaft and blade, means extending about a portion of said circular blade and spaced therefrom for urging the fruit onto said blade, and spaced-apart means on opposite sides of said blade and rotatable therewith for holding the fruit in a predetermined lateral orientation, said spaced-apart means including a disc mounted on each side of and spaced from and lying substantially parallel to said blade and spring means for urging said discs inwardly toward said blade.

References Cited by the Examiner
UNITED STATES PATENTS

| | | | |
|---|---|---|---|
| 2,259,332 | 10/1941 | Winkelman | 146—28 |
| 2,474,492 | 6/1949 | Perrelli et al. | 146—28 X |
| 2,556,266 | 6/1951 | Furtado | 146—28 |
| 2,745,453 | 5/1956 | Perrelli et al. | 146—28 |
| 3,087,522 | 4/1963 | Ciraolo | 146—73 |
| 3,119,425 | 1/1964 | Buchner | 146—28 |

ROBERT C. RIORDON, *Primary Examiner.*

J. SPENCER OVERHOLSER, *Examiner.*